(12) United States Patent
Marutani et al.

(10) Patent No.: US 11,131,498 B2
(45) Date of Patent: Sep. 28, 2021

(54) HOUSEHOLD ELECTRICAL APPLIANCE AND REFRIGERATOR

(71) Applicant: Toshiba Lifestyle Products & Services Corporation, Kawasaki (JP)

(72) Inventors: Yuuki Marutani, Kawasaki (JP); Ryo Kawada, Kawasaki (JP); Kengo Matsunaga, Kawasaki (JP)

(73) Assignee: Toshiba Lifestyle Products & Services Corporation, Kawasaki (JP)

( * ) Notice: Subject to any disclaimer, the term of this patent is extended or adjusted under 35 U.S.C. 154(b) by 0 days.

(21) Appl. No.: 16/375,190

(22) Filed: Apr. 4, 2019

(65) Prior Publication Data

US 2019/0316835 A1 Oct. 17, 2019

(30) Foreign Application Priority Data

Apr. 11, 2018 (JP) .............................. JP2018-076112

(51) Int. Cl.
  *F25D 23/12* (2006.01)
  *F25D 23/04* (2006.01)
  *H04N 7/18* (2006.01)
  *H04N 5/225* (2006.01)

(52) U.S. Cl.
  CPC ............. *F25D 23/12* (2013.01); *F25D 23/04* (2013.01); *H04N 5/2252* (2013.01); *H04N 5/2257* (2013.01); *H04N 7/183* (2013.01)

(58) Field of Classification Search
  None
  See application file for complete search history.

(56) References Cited

U.S. PATENT DOCUMENTS

| | | | |
|---|---|---|---|
| 2008/0147261 A1* | 6/2008 | Ichinose | G01C 22/006 701/24 |
| 2015/0260450 A1* | 9/2015 | Marutani | F25D 29/00 62/131 |
| 2016/0125466 A1* | 5/2016 | Kulkarni | G06F 3/04842 705/14.58 |
| 2016/0358508 A1* | 12/2016 | Cheatham, III | G09B 19/0092 |
| 2017/0053516 A1* | 2/2017 | Wu | G08B 21/24 |
| 2018/0285653 A1* | 10/2018 | Li | G08B 13/19613 |

FOREIGN PATENT DOCUMENTS

| | | |
|---|---|---|
| CN | 104329882 A | 2/2015 |
| CN | 105074365 A | 11/2015 |
| CN | 105719113 A | 6/2016 |
| CN | 107861391 A | 3/2018 |
| JP | 2018-004213 | 1/2018 |

OTHER PUBLICATIONS

Combined Chinese Office Action and Search Report dated Nov. 4, 2020 in Patent Application No. 201910275170.3 (with English translation of Category of Cited Documents), citing documents AO-AR therein, 11 pages.

* cited by examiner

*Primary Examiner* — Edemio Navas, Jr.
(74) *Attorney, Agent, or Firm* — Oblon, McClelland, Maier & Neustadt, L.L.P.

(57) ABSTRACT

A household electrical appliance of the embodiment includes: a peripheral camera that records the periphery of a household electrical appliance main body; control means that controls operation of the peripheral camera; and human detection means that detects human presence. When human presence is detected by the human detection means, the control means activates the peripheral camera.

18 Claims, 12 Drawing Sheets

HOUSEHOLD ELECTRICAL APPLIANCE AND REFRIGERATOR

FIELD OF THE INVENTION

Embodiments described herein relate to a household electrical appliance and a refrigerator as an example of the household electrical appliance.

DESCRIPTION OF THE RELATED ART

In recent years, an empty home delivery service of delivering an article to an empty home has been provided. In this type of system, when a delivery person of an article enters an empty home by opening a smart key of the entrance with an authentication number formally acquired in advance, the action of the delivery person is recorded by an in-home monitoring camera, and the recorded data is transmitted to a user's mobile terminal. With this, the user can check the delivery person's action from outside, on the basis of the recorded data transmitted to the user's mobile terminal. Meanwhile, in recent years, installation of a camera in a refrigerator which is an example of a household electrical appliance has been considered.

By constructing the aforementioned empty home delivery system in association with a storage destination of an article, such as a household electrical appliance like a refrigerator storing food, for example, it is possible to monitor from a position where a delivery person comes closest at the time of delivery, that is, the household electrical appliance which is the storage destination of the article. This can improve security.

The embodiment provides a household electrical appliance applied to an empty home delivery system to improve security, and a refrigerator as an example of the household electrical appliance.

A household electrical appliance of the embodiment includes: a peripheral camera that records a periphery of a household electrical appliance main body; control means that controls operation of the peripheral camera; and human detection means that detects human presence. When human presence is detected by the human detection means, the control means activates the peripheral camera.

A refrigerator of the embodiment is included as an example of the household electrical appliance of the embodiment.

DETAILED DESCRIPTION OF THE PREFERRED EMBODIMENTS

Figure 1:
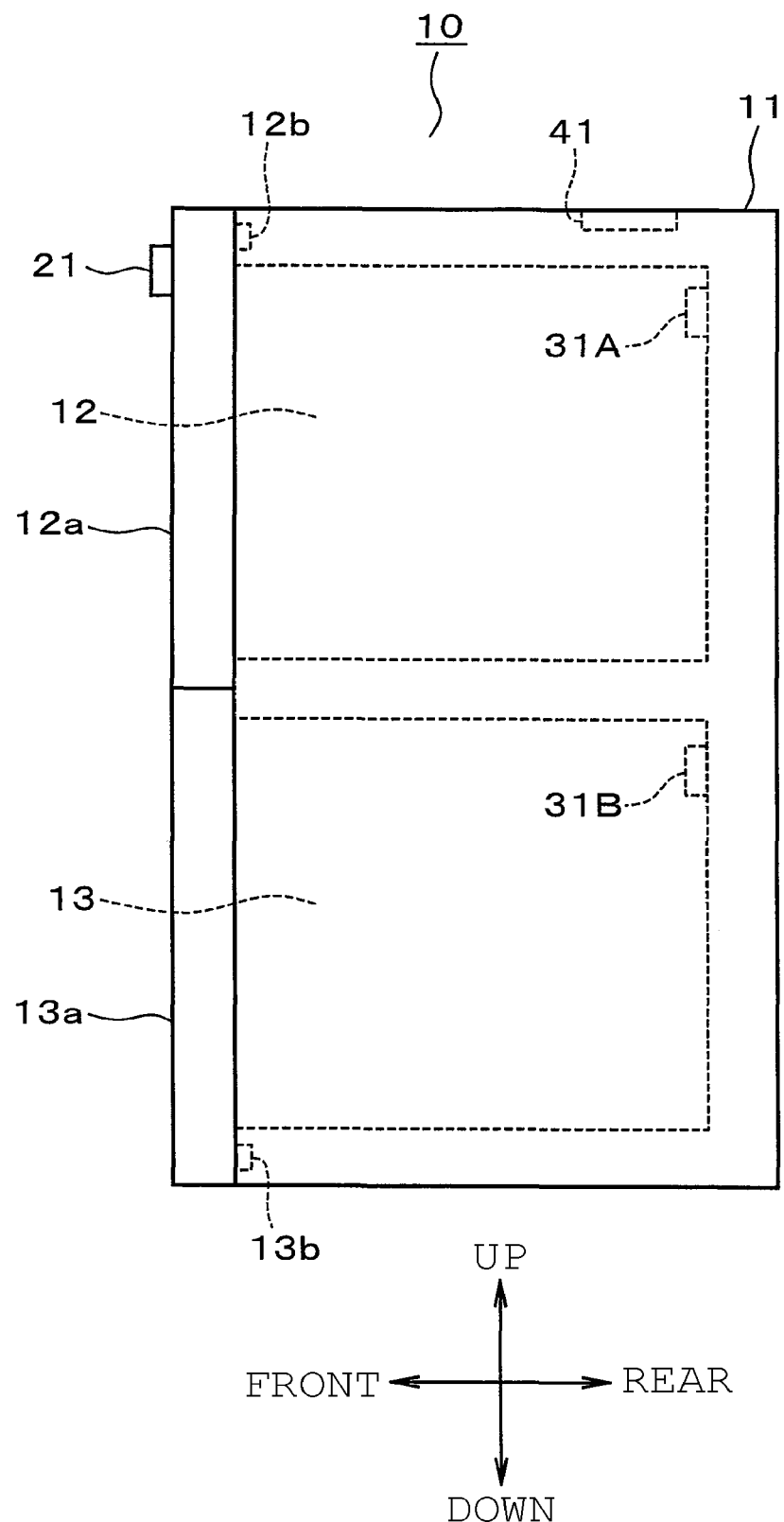
FIG. 1 is a side view schematically showing a configuration example of a refrigerator of a first embodiment.

Hereinafter, multiple embodiments of a household electrical appliance and a refrigerator will be described with reference to the drawings. Note that in each embodiment, substantially the same elements are assigned the same reference numerals and descriptions thereof will be omitted.

First Embodiment

A refrigerator 10 exemplified in FIG. 1 is an example of a household electrical appliance, and includes, inside a refrigerator main body 11 configured of a rectangular box-shaped adiabatic housing forming its outer hull, multiple storage rooms 12, 13. The refrigerator main body 11 is an example of a household electrical appliance main body, and forms a main body of the refrigerator 10. The storage room 12 is an example of a storage portion storing articles, and in the embodiment, is kept within a refrigeration temperature range to be provided as a refrigerator compartment storing food. The storage room 13 is an example of a storage portion storing articles, and in the embodiment, is provided as a freezer compartment kept within a freezing temperature range. Hereinafter, the storage room 12 is referred to as a refrigerator compartment 12 and the storage room 13 is referred to as a freezer compartment 13 as appropriate.

In the embodiment, the refrigerator compartment 12 is provided on the upper side of the refrigerator main body 11, and the freezer compartment 13 is provided on the lower side of the refrigerator main body 11. A front face of the refrigerator compartment 12 is open, and the clear aperture is openable by a refrigerator compartment door 12*a*. A front face of the freezer compartment 13 is open, and the clear aperture is openable by a freezer compartment door 13*a*. Note that the refrigerator 10 may be configured to include other storage rooms such as a vegetable room kept within the refrigeration temperature range, a small freezer compartment kept within the freezing temperature range, and an ice compartment kept within the freezing temperature range, for example.

The refrigerator 10 includes an outside camera 21. The outside camera 21 is an example of a peripheral camera, and records the periphery of the refrigerator main body 11. In the embodiment, the outside camera 21 is provided in a front portion of the refrigerator main body 11, more specifically, in a front portion of the refrigerator compartment door 12*a* on the upper side, and can record particularly the front area of the periphery of the refrigerator main body 11. The outside camera 21 is provided in a higher position to be able to record the periphery of the refrigerator main body 11 in a bird's eye view. Accordingly, even when there is an obstacle such as a table or a chair around the refrigerator main body 11, the periphery of the refrigerator main body 11 can be recorded favorably. Note that the outside camera 21 may be provided in other appropriate positions, as long as the outside camera 21 can record the periphery of the refrigerator main body 11.

The refrigerator 10 also includes a refrigerator compartment inside camera 31A and a freezer compartment inside camera 31B. The refrigerator compartment inside camera 31A is an example of an internal camera. In the embodiment, the refrigerator compartment inside camera 31A is provided on a rear face inside the refrigerator compartment 12, and can record the inside of the refrigerator compartment 12. The refrigerator compartment inside camera 31A is provided in a higher position inside the refrigerator compartment 12 to be able to record the inside of the refrigerator compartment 12 in a bird's eye view. Accordingly, even when a large amount of food is stored inside the refrigerator compartment 12, the inside of the refrigerator compartment 12 can be recorded favorably. Additionally, when the refrigerator compartment door 12a is open, the front area of the refrigerator main body 11 can be recorded through the front clear aperture of the refrigerator compartment 12. Note that the refrigerator compartment inside camera 31A may be provided in other appropriate positions, as long as the refrigerator compartment inside camera 31A can record the inside of the refrigerator compartment 12.

The freezer compartment inside camera 31B is an example of an internal camera. The freezer compartment inside camera 31B is provided on a rear face inside the freezer compartment 13, and can record the inside of the freezer compartment 13. The freezer compartment inside camera 31B is provided in a higher position inside the freezer compartment 13 to be able to record the inside of the freezer compartment 13 in a bird's eye view. Accordingly, even when a large amount of food is stored inside the freezer compartment 13, the inside of the freezer compartment 13 can be recorded favorably. Additionally, when the freezer compartment door 13a is open, the front area of the refrigerator main body 11 can be recorded through the front clear aperture of the freezer compartment 13. Note that the freezer compartment inside camera 31B may be provided in other appropriate positions, as long as the freezer compartment inside camera 31B can record the inside of the freezer compartment 13.

The refrigerator 10 also includes a controller 41. The controller 41 is mainly configured of a microcomputer, for example, and generally controls the operation of the refrigerator 10 on the basis of a control program. The controller 41 also controls the operations of the outside camera 21, the refrigerator compartment inside camera 31A, the freezer compartment inside camera 31B, and other parts. The controller 41 is an example of control means.

Figure 2:
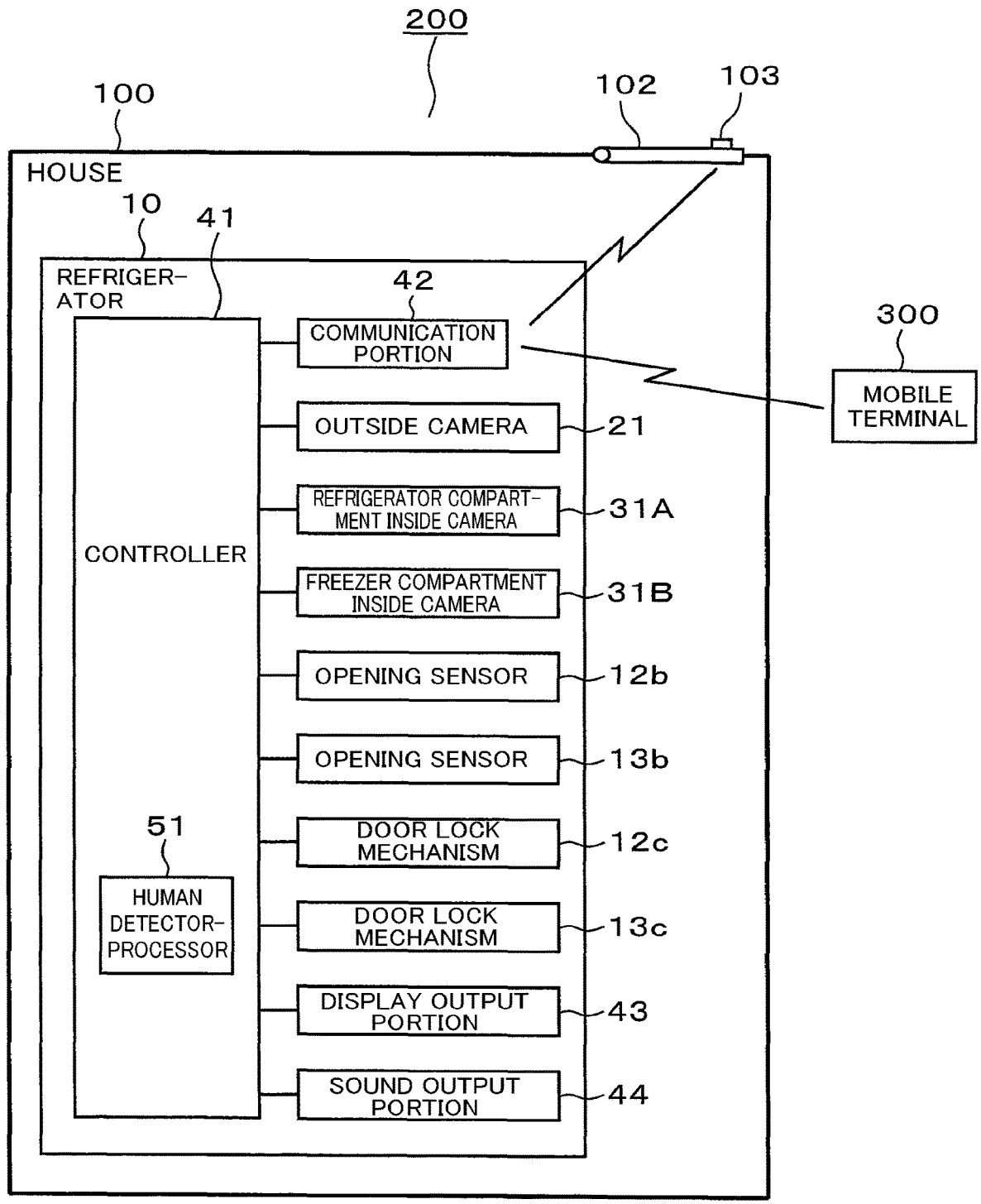
FIG. 2 is a diagram schematically showing a configuration example of an empty home delivery system of the first embodiment.

Next, a configuration example of a control system of the refrigerator 10 will be described. Specifically, as shown in FIG. 2, the aforementioned outside camera 21, refrigerator compartment inside camera 31A, and freezer compartment inside camera 31B are connected to the controller 41. Additionally, a communication portion 42 is connected to the controller 41. The communication portion 42 is an example of communication means, and is configured to be capable of performing radio communication with a smart key 103 provided in an entrance door 102 that opens and closes an entrance 101 of a house 100.

When the entrance door 102 is opened, the smart key 103 generates and transmits an entrance door open signal to the communication portion 42. When the entrance door 102 is closed, the smart key 103 generates and transmits an entrance door close signal to the communication portion 42.

When the entrance door 102 is locked, the smart key 103 generates and transmits an entrance door lock signal to the communication portion 42. The refrigerator 10 is communicably connected with the smart key 103 and thereby constructs an empty home delivery system 200 of the embodiment. Note that the communication portion 42 and the smart key 103 may communicate through wired communication.

The communication portion 42 is also configured to be capable of performing radio communication with a mobile terminal 300. The mobile terminal 300 is an example of an external terminal, and is equipment carried by a user when he/she goes out, such as a smartphone, a tablet, or a notebook computer.

Opening sensors 12b, 13b, are also connected to the controller 41. The opening sensor 12b is an example of opening detection means, and detects opening and closing of the refrigerator compartment door 12a. Specifically, the opening sensor 12b is provided in a position on the front face of the refrigerator main body 11 that faces a rear face of the closed refrigerator compartment door 12a. When the refrigerator compartment door 12a is opened, the opening sensor 12b generates and outputs a refrigerator compartment door open signal to the controller 41. Upon receipt of the refrigerator compartment open signal from the opening sensor 12b, the controller 41 detects opening of the refrigerator compartment door 12a. When the refrigerator compartment door 12a is closed, the opening sensor 12b generates and outputs a refrigerator compartment door close signal to the controller 41. Upon receipt of the refrigerator compartment close signal from the opening sensor 12b, the controller 41 detects closure of the refrigerator compartment door 12a.

The opening sensor 13b is an example of opening detection means, and detects opening and closing of the freezer compartment door 13a. Specifically, the opening sensor 13b is provided in a position on the front face of the refrigerator main body 11 that faces a rear face of the closed freezer compartment door 13a. When the freezer compartment door 13a is opened, the opening sensor 13b generates and outputs a freezer compartment door open signal to the controller 41. Upon receipt of the freezer compartment door open signal from the opening sensor 13b, the controller 41 detects opening of the freezer compartment door 13a. When the freezer compartment door 13a is closed, the opening sensor 13b generates and outputs a freezer compartment door close signal to the controller 41. Upon receipt of the freezer compartment close signal from the opening sensor 13b, the controller 41 detects closure of the freezer compartment door 13a.

Door lock mechanisms 12c, 13c are also connected to the controller 41. The door lock mechanism 12c is configured to lock the closed refrigerator compartment door 12a in the closed state with an unillustrated hook. The door lock mechanism 13c is configured to lock the closed freezer compartment door 13a in the closed state with an unillustrated hook. The operations of the door lock mechanisms 12c, 13c are controlled by the controller 41.

A display output portion 43 is also connected to the controller 41. The display output portion 43 is configured of a liquid crystal panel, an organic EL panel, or the like, and outputs various information including character information and image information in a visual form. A sound output portion 44 is also connected to the controller 41. The sound output portion 44 is configured of a speaker, a buzzer, or the like, and outputs various information including sound information in an aural form.

The controller 41 executes the control program to thereby virtually implement a human detector-processor 51 by software. Note that the human detector-processor 51 may be configured of hardware, or may be configured of combination of software and hardware.

The human detector-processor 51 is an example of human detection means, and detects human presence in the house 100. In the embodiment, after receiving an entrance door lock signal from the smart key 103 through the communication portion 42, upon receipt of an entrance door open signal from the smart key 103 through the communication portion 42, the human detector-processor 51 detects that the entrance door 102 is opened and a human enters the house 100, that is, detects human presence in the house 100.

Specifically, after a user who is a resident of the house 100 locks the entrance door 102 with the smart key 103 when going out, when a delivery person of the empty home delivery service releases the lock of the smart key 103 with an authentication number formally acquired in advance and opens the entrance door 102, the human detector-processor 51 determines that there is a human in the house 100. Note that the human detector-processor 51 determines that there is a human in the house 100 by receiving an entrance door open signal from the smart key 103. Hence, the human detector-processor 51 can determine that there is a human in the house 100 when the entrance door 102 is unlawfully opened as well.

The human detector-processor 51 can also determine whether a human approaches the refrigerator main body 11 by analyzing recorded data obtained by the outside camera 21. Specifically, the human detector-processor 51 can subject the recorded data obtained by the outside camera 21 to human body recognition processing based on a known image processing technique, such as matching processing with human body patterns, to analyze whether a "human" is contained in the recorded data. Then, if it is confirmed as a result of the analysis processing that a "human" is contained in the recorded data, the human detector-processor 51 detects that a human approaches the refrigerator main body 11, that is, determines that a human approaches the refrigerator main body 11.

The human detector-processor 51 can also determine whether a human enters a room in which the refrigerator main body 11 is installed, by analyzing recorded data obtained by the outside camera 21. Specifically, the human detector-processor 51 can subject the recorded data obtained by the outside camera 21 to human body recognition processing based on a known image processing technique and background recognition processing, to analyze whether a "human" and a "background of a room in which the refrigerator main body 11 is installed" are contained in the recorded data. Then, if it is confirmed as a result of the analysis processing that "human" contained in the recorded data, and also that the human is in the "room in which the refrigerator main body 11 is installed," the human detector-processor 51 detects that a human enters the room in which the refrigerator main body 11 is installed, that is, determines that a human enters the room in which the refrigerator main body 11 is installed.

Note that image data of the "background of the room in which the refrigerator main body 11 is installed" can be obtained as background data when the user records the "room in which the refrigerator main body 11 is installed" with the outside camera 21 when the user is at home, for example. The background data can also be obtained when the controller 41 automatically records the "room in which the refrigerator main body 11 is installed" with the outside camera 21 on the basis of the control program. The controller 41 stores the image data of the "background of the room in which the refrigerator main body 11 is installed" thus obtained, for example.

Figure 3:
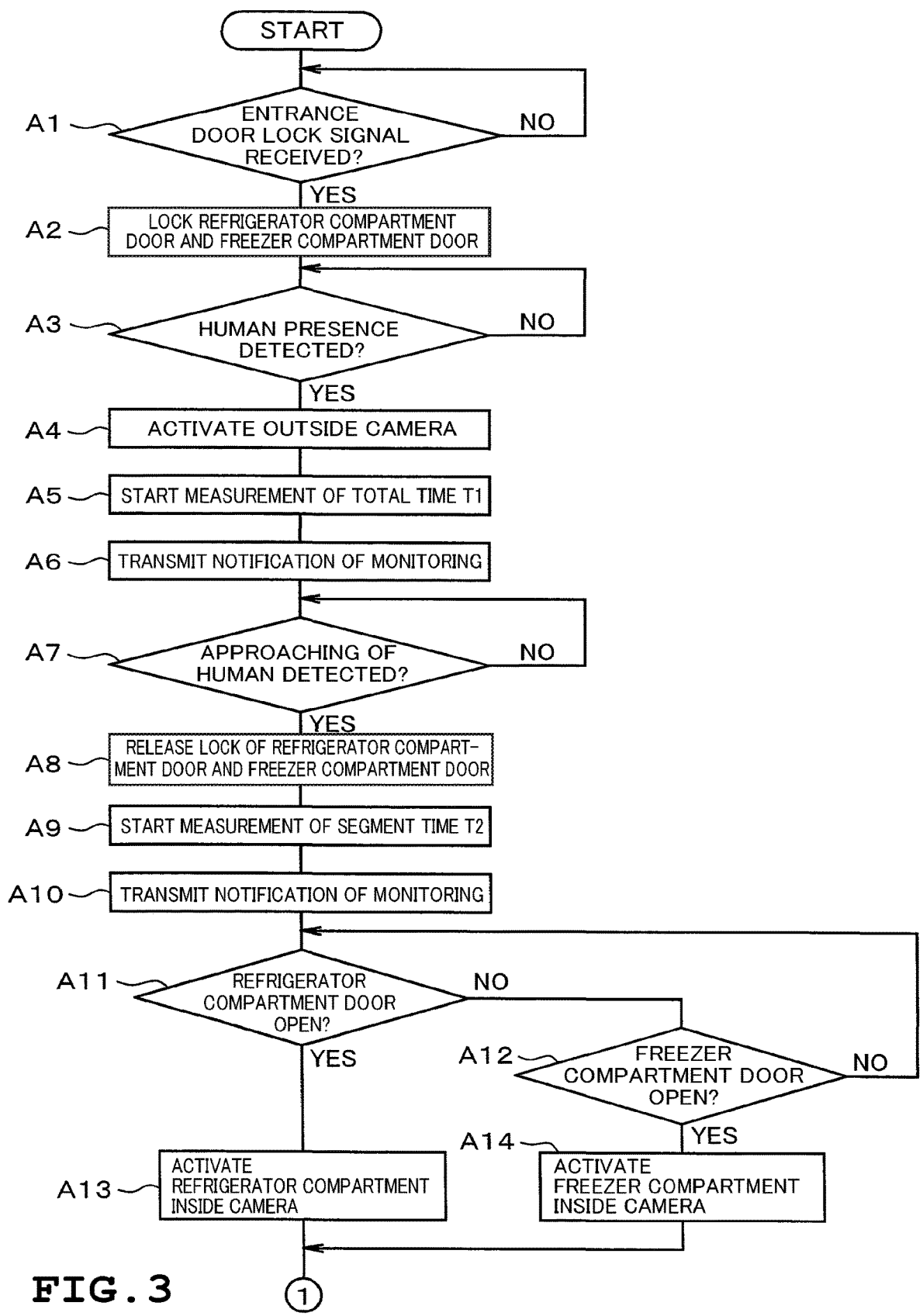
FIG. 3 is a flowchart (No. 1) showing an example of the content of control performed in the empty home delivery system of the first embodiment.
Figure 4:
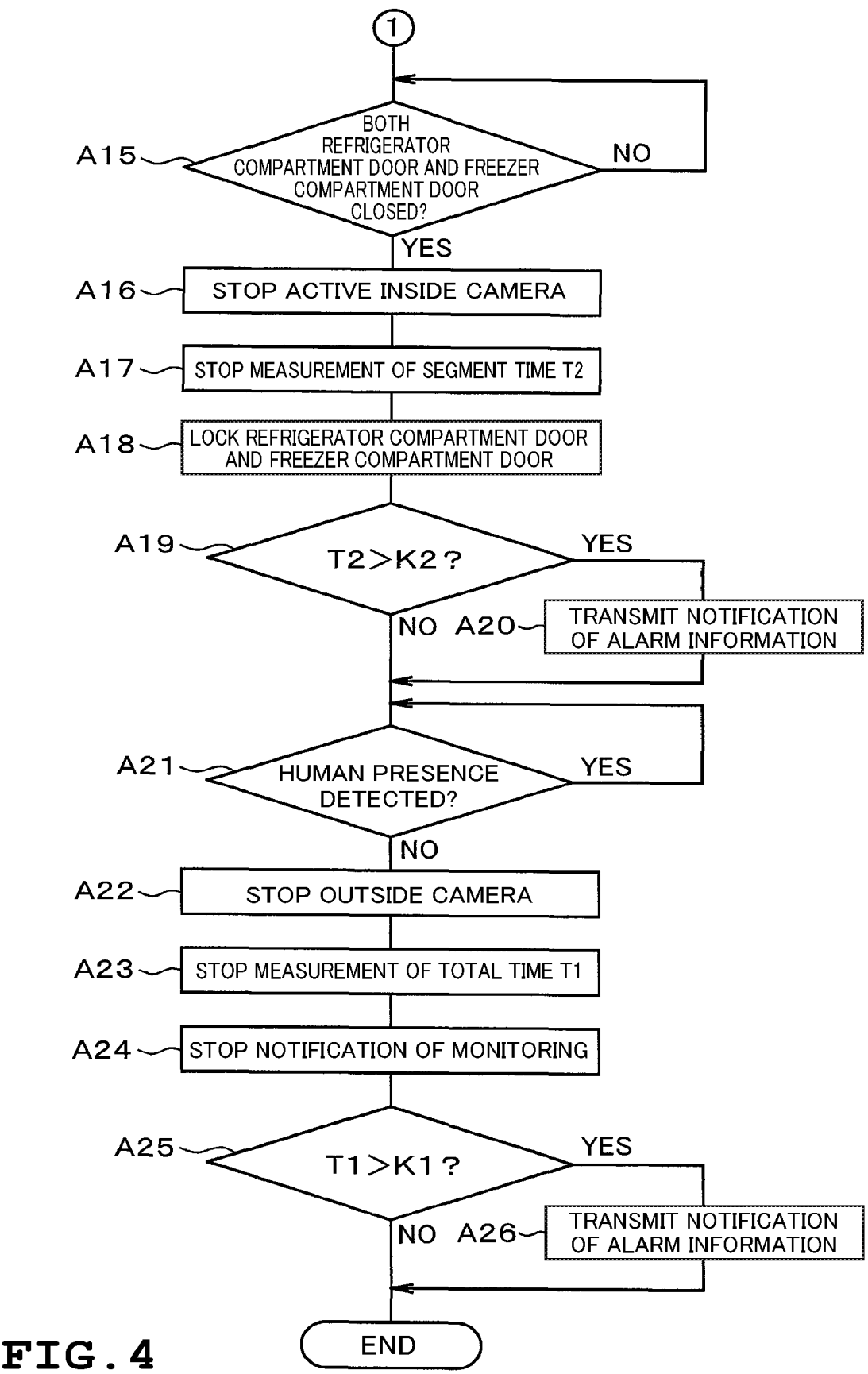
FIG. 4 is a flowchart (No. 2) showing an example of the content of control performed in the empty home delivery system of the first embodiment.

Next, an example of the content of control performed in the empty home delivery system 200 of the embodiment will be described on the basis of flowcharts exemplified in FIGS. 3 and 4. Specifically, as exemplified in FIGS. 3 and 4, upon receipt of an entrance door lock signal from the smart key 103 (A1: YES), the controller 41 of the refrigerator 10 controls the door lock mechanisms 12c, 13c to lock the refrigerator compartment door 12a and the freezer compartment door 13a (A2). Thus, when the user who is a resident of the house 100 locks the entrance door 102 with the smart key 103 when going out, for example, the refrigerator 10 is set to a state where the refrigerator compartment door 12a and the freezer compartment door 13a are unopenable. Note that the controller 41 may be configured to lock the refrigerator compartment door 12a and the freezer compartment door 13a on condition that an entrance door close signal is received from the smart key 103.

Then, the controller 41 monitors whether human presence in the house 100 is detected by the human detector-processor 51 (A3). In the embodiment, the human detector-processor 51 detects human presence in the house 100 when an trance door open signal is received from the smart key 103. Then, when human presence in the house 100 is detected by the human detector-processor 51 (A3: YES), the controller 41 activates the outside camera 21 (A4). Thus, recording of the periphery of the refrigerator main body 11, particularly the front area of the refrigerator main body 11 in the embodiment, is started. Additionally, when human presence in the house 100 is detected by the human detector-processor 51, the controller 41 starts measurement of a total time T1 with an unillustrated timer (A5).

Moreover, when human presence in the house 100 is detected by the human detector-processor 51, the controller 41 transmits a notification indicating that monitoring is performed (A6). Note that in the notification processing, character information indicating that monitoring is performed may be notified in a visual form through the display output portion 43, or sound information indicating that monitoring is performed may be notified in an aural form through the sound output portion 44. Here, in the stage of step A6, it is highly likely that the human that enters the house 100, that is, the delivery person, has not reached the room in which the refrigerator 10 is installed. For this reason, information indicating that monitoring is performed should preferably be notified through the sound output portion 44, so that the information is conveyed to the delivery person who is assumed to be outside the room in which the refrigerator 10 is installed. Note that notification by the display output portion 43 may also be performed at this time.

When recording by the outside camera 21 is started, the controller 41 analyzes the obtained recorded data to extract an image of a human contained in the recorded data. Then, if an image of a human is extracted, the controller 41 displays the image on the display output portion 43.

Then, the controller 41 monitors whether approach of a human to the refrigerator main body 11 is detected by the human detector-processor 51 (A7). Then, when approach of a human to the refrigerator main body 11 is detected by the human detector-processor 51 (A7: YES), the controller 41 controls the door lock mechanisms 12c, 13c to release the locks of the refrigerator compartment door 12a and the freezer compartment door 13a (A8). Thus, the refrigerator 10 is set to a state where the refrigerator compartment door 12a and the freezer compartment door 13a are openable. Additionally, after releasing the locks of the refrigerator compartment door 12a and the freezer compartment door 13a, the controller 41 starts measurement of a segment time T2 with an unillustrated timer (A9).

Additionally, when approach of a human to the refrigerator main body 11 is detected by the human detector-processor 51, the controller 41 transmits a notification that monitoring is performed (A10). Note that in the notification processing, character information indicating that monitoring is performed may be notified in a visual form through the display output portion 43, or sound information indicating that monitoring is performed may be notified in an aural form through the sound output portion 44. Here, in the stage of step A10, it is highly likely that the human that enters the house 100, that is, the delivery person, has entered the room in which the refrigerator 10 is installed and is near the refrigerator 10. For this reason, information indicating that monitoring is performed should preferably be notified through the display output portion 43, so that the information is conveyed to the delivery person who is assumed to be near the refrigerator 10. Note that notification by the sound output portion 44 may also be performed at this time.

Then, the controller 41 monitors whether the refrigerator compartment door 12a is opened on the basis of whether a signal is received from the opening sensor 12b (A11). The controller 41 also monitors whether the freezer compartment door 13a is opened on the basis of whether a signal is received from the opening sensor 13b (A12). Then, when opening of the refrigerator compartment door 12a is detected (A11: YES), the controller 41 activates the refrigerator compartment inside camera 31A (A13). Thus, recording of the inside of the refrigerator compartment 12 is started. Additionally, when opening of the freezer compartment door 13a is detected (A12: YES), the controller 41 activates the freezer compartment inside camera 31B (A14). Thus, recording of the inside of the freezer compartment 13 is started.

Then, when recording by the refrigerator compartment inside camera 31A is started, or recording processing by the freezer compartment inside camera 31B is started, the controller 41 analyzes the obtained recorded data to extract an image of a human contained in the recorded data. Then, if an image of a human is extracted, the controller 41 displays the image on the display output portion 43.

Moreover, when recording by the refrigerator compartment inside camera 31A is started, or recording processing by the freezer compartment inside camera 315 is started, the controller 41 monitors whether both the refrigerator compartment door 12a and the freezer compartment door 13a are closed, on the basis of whether a signal is received from the opening sensors 12b, 12c (A15). Then, when both the refrigerator compartment door 12a and the freezer compartment door 13a are closed (A15: YES), the controller 41 stops either the refrigerator compartment inside camera 31A or the freezer compartment inside camera 31B that is active (A16). Then, the controller 41 ends measurement of the segment time T2 (A17), and locks the refrigerator compartment door 12a and the freezer compartment door 13a (A18). Thus, the refrigerator 10 is set to a state where the refrigerator compartment door 12a and the freezer compartment door 13a are unopenable.

Then, the controller 41 compares the measured segment time 12 and a predetermined reference segment time K2 (A19). Note that the reference segment time K2 can be changed as appropriate, and may be set to a time generally assumed to be necessary for storing food in the refrigerator 10. Then, the segment time T2 is longer than the reference segment time K2 (A19: YES), the controller 41 notifies the mobile terminal 300 of alarm information by the communication portion 42, and proceeds to step A21. The alarm information contains information indicating that the time taken to store food in the refrigerator 10 was longer than the reference time. The alarm information may be output by display or by sound in the mobile terminal 300.

Meanwhile, if the segment time T2 is shorter than or equivalent to the reference segment time K2 (A19: NO), the controller 41 proceeds to step A21 without transmitting a notification of the alarm information.

After proceeding to step A21, the controller 41 monitors whether human presence in the house 100 is no longer detected by the human detector-processor 51 (A21). In the embodiment, the human detector-processor 51 detects that there is no longer any human in the house 100 when an entrance door close signal or an entrance door lock signal is received from the smart key 103. The entrance door close signal in this stage is transmitted from the smart key 103 when the delivery person exits the house 100 and closes the entrance door 102. The entrance door lock signal in this stage is transmitted from the smart key 103 when the delivery person having exited the house 100 locks the smart key 103 with an authentication number formally acquired in advance.

Note that from the viewpoint of security, in step A21, the detection that there is no longer any human in the 100 should preferably be made when an entrance door lock signal is received from the smart key 103. Then, whey, human presence in the house 100 is no longer detected by the human detector-processor 51 (A21: NO), the controller 41 stops the outside camera 21 (A22). Then, the controller 41 ends measurement of the total time T1 (A23), and stops the notification that monitoring is performed (A24).

Then, the controller 41 compares the measured total time IT and a predetermined reference total time K1 (A25). Note that the reference total time K1 can be changed as appropriate as long as it is longer than the aforementioned reference segment time K2, and may be set to a time generally assumed to be necessary for entering the house 100, finishing storage of food in the refrigerator 10, and exiting the house 100. Then, if the total time T1 is longer than the reference total time K1 (A25: YES), the controller 41 notifies the mobile terminal 300 of alarm information by the communication portion 42 (A26), and ends the control. The alarm information contains information indicating that the time the delivery person stayed to store food in the refrigerator 10 was longer than the reference time. The alarm information may be output by display or by sound in the mobile terminal 300.

Meanwhile, if the total time T1 is shorter than or equivalent to the reference total time K1 (A25: NO), the controller 41 ends the control without transmitting a notification of the alarm information.

According to the refrigerator 10 of the embodiment, the controller 41 activates the outside camera 21 when human presence in the house 100 is detected by the human detector-processor 51. This enables monitoring of humans entering the house 100 while the user is away, that is, the delivery person, with the outside camera 21. Hence, by constructing the empty home delivery system 200 by applying the refrigerator 10, it is possible to improve security of an empty home delivery service in which articles, in this case, food, is delivered to an empty home.

According to the refrigerator 10, the controller 41 detects that a human enters the house 100 with the human detector-processor 51. With this, monitoring can be started by using the entry of the delivery person into the house 100 as a trigger. Note that even if a person other than the delivery person enters the house 100, the person can be monitored. Hence, security of an empty home can be improved.

According to the refrigerator 10, the controller 11 detects that a human enters the room in which the refrigerator main body 11 is installed with the human detector-processor 51. With this, monitoring can be started by using the entry of the delivery person into the room in which the refrigerator main body 11 is installed as a trigger. Note that even if a person other than the delivery person enters the room, the person can be monitored. Hence, security of an empty home can be improved.

According to the refrigerator 10, the controller 41 releases the locks of the refrigerator compartment door 12a and the freezer compartment door 13a when approach of a human to the refrigerator main body 11 is detected by the human detector-processor 51. With this, the locked state of the refrigerator compartment door 12a and the freezer compartment door 13a can be maintained until the delivery person approaches the refrigerator 10. Hence, theft of the food inside the refrigerator 10, for example, can be prevented, and security can be improved. Moreover, the refrigerator 10 can be set to a state where the refrigerator compartment door 12a and the freezer compartment door 13a are openable, in response to the approach of the delivery person to the refrigerator 10. Hence, the delivery person is not required to change the refrigerator compartment door 12a and the freezer compartment door 13a to an openable state, and can smoothly store food in the storage rooms 2, 13 as soon as he/she approaches the refrigerator 10.

According to the refrigerator 10, the controller 41 activates the refrigerator compartment inside camera 31A when opening of the refrigerator compartment door 12a is detected on the basis of the detection result of the opening sensor 12b. The controller 41 also activates the freezer compartment inside camera 31B when opening of the freezer compartment door 13a is detected on the basis of the detection result of the opening sensor 13b. Hence, storage of food by the delivery person, that is, how the delivery person stores food can be monitored on the basis of data recorded by the refrigerator compartment inside camera 31A or the freezer compartment inside camera 31B.

According to the refrigerator 10, the controller 41 locks the refrigerator compartment door 12a and the freezer compartment door 13a when the refrigerator compartment door 12a and the freezer compartment door 13a are closed. By thus locking when the refrigerator compartment door 12a and the freezer compartment door 13a are closed after completion of storing food in the storage rooms 12, 13, it is possible to prevent opening of the refrigerator compartment door 12a and the freezer compartment door 13a after the lock, so that security can be improved. Moreover, since the delivery person is not required to change the refrigerator compartment door 12a and the freezer compartment door 13a to an unopenable state, workload can be reduced.

According to the refrigerator 10, the controller 11 measures the segment time T2, that is, the time between releasing the locks and re-locking of the refrigerator compartment door 12a and the freezer compartment door 13a. Hence, it is possible to assume whether the delivery person is acting unusually during storage of food, on the basis of the measured segment time T2.

According to the refrigerator 10, the controller 41 measures the total time T1, that is, the time between detection and no detection of human presence in the house 100 by the human detector-processor 51. Hence, it is possible to assume whether the delivery person is acting unusually in the house 100, on the basis of the measured total time T1.

According to the refrigerator 10, the controller 41 notifies the user's mobile terminal 300 of alarm information by the communication portion 42, when the measured total time T1 is longer than the predetermined reference total time K1, and when the measured segment time T2 is longer than the predetermined reference segment time K2. Thus, the user outside can be notified when it is assured, on the basis of the measured times T1, T2, that the delivery person is acting unusually. Note that instead of, or in addition to notifying the user's mobile terminal 300 of alarm information, the controller 41 may be configured to notify the police or a security service of the alarm information.

According to the refrigerator 10, the controller 41 transmits a notification that monitoring is performed when human presence in the house 100 is detected by the human detector-processor 51. The controller 41 also transmits a notification that monitoring is performed when the locks of the refrigerator compartment door 12a and the freezer compartment door 13a are released. By thus transmitting a notification that monitoring is performed, it is possible to psychologically pressure the delivery person so not to act unusually.

According to the refrigerator 10, the controller 41 displays the person recorded by the outside camera 21, the refrigerator compartment inside camera 31A, and the freezer compartment inside camera 31D by the display output portion 43. Hence, image information on the delivery person himself/herself can be displayed on the display output portion 43, so that a stronger psychological pressure can be put on the delivery person to prevent unusual behavior. Note that the controller 41 may be capable of performing image processing with higher accuracy, such as image processing that enables face recognition, to display the "face" of the delivery person himself/herself on the display output portion 43. This can psychologically pressure the delivery person more intensely.

Second Embodiment

In a second embodiment, a controller 41 is also capable of performing guidance processing. Specifically, when human presence in a house 100 is detected by a human detector-processor 51, the controller 41 performs guidance processing for guiding a delivery person to a room in which a refrigerator main body 11 is installed. In this case, as guidance processing, the controller 41 performs processing of showing a route from an entrance which is the doorway of the house 100 to the room in which the refrigerator main body 11 is installed.

Figure 5:
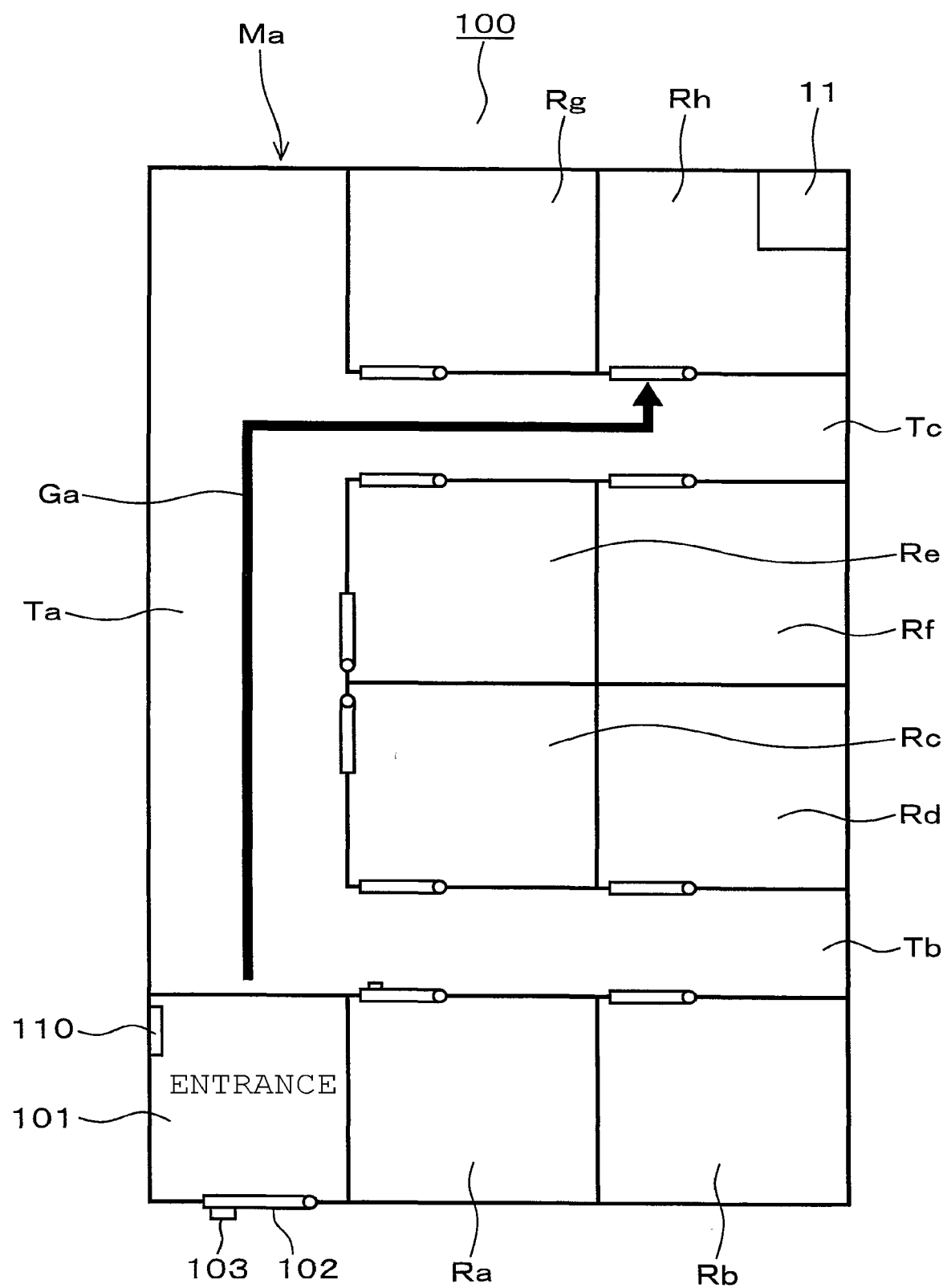
FIG. 5 is a diagram schematically showing an example of an approach route map of a second embodiment.

That is, the controller 41 stores an approach route map Ma exemplified in FIG. 5 in an unillustrated storage portion configured of a memory, for example. The approach route map Ma is map information showing the layout of multiple rooms Ra to Rh and the positional relation among passages Ta to Tc in the house 100, and also snowing a route Ga from an entrance 101 of the house 100 to the room Rh in which the refrigerator main body 11 is installed. The user can create the approach route map Ma by way of an unillustrated operation portion for operating a refrigerator 10, for example. The user can also modify the approach route map Ma by way of the operation portion of the refrigerator 10. Additionally, an entrance display output portion 110 configured of a liquid crystal panel or an organic EL panel, for example, is provided in the entrance 101 of the house 100. The entrance display output portion 110 can output by displaying information such as the approach route map Ma.

When human presence in the house 100 is detected by the human detect processor 51, the controller 41 transmits the approach route map Ma stored in the storage portion to the entrance display output portion 110 through a communication portion 42. Then, the entrance display output portion 110 outputs by displaying the received approach route map Ma.

According to the refrigerator 10 of the embodiment, a delivery person unaware of which room of the house 100 the refrigerator 10 is installed can be guided smoothly to the room Rh in which the refrigerator 10 is installed with the approach route map Ma. Additionally, according to the refrigerator 10, the approach route map Ma as visual information can be used to clearly inform the delivery person of the location of the refrigerator 10 in the house 100.

Third Embodiment

Figure 6:
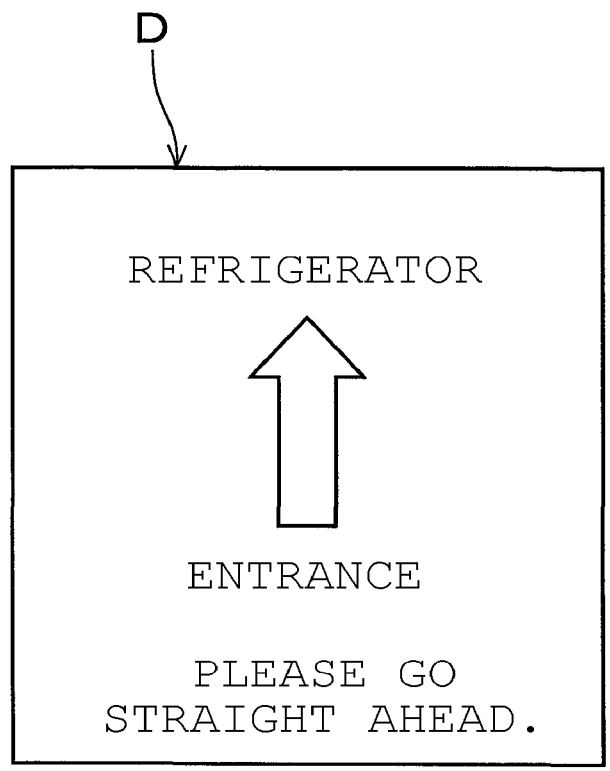
FIG. 6 is a diagram schematically showing an example of a direction indicator sign of a third embodiment.

A third embodiment, too, is an embodiment related to guidance processing. Specifically, a controller 41 stores a direction indicator sign D exemplified in FIG. 6 in an unillustrated storage portion configured of a memory, for example. The direction indicator sign D is sign information showing the direction of a room in which a refrigerator main body 11 is installed, as viewed from an entrance which is the doorway of a house 100. Note that the direction indicator sign D may contain character information such as "go straight," that is, character information indicating the direction in which to proceed from the entrance of the house 100. A user can create the direction indicator sign D by way of an operation portion of a refrigerator 10, for example. The user can also modify the direction indica sign D by way of the operation portion of the refrigerator 10.

When human presence in the house 100 is detected by a human detector-processor 51, the controller 41 transmits the direction indicator sign D stored in the storage portion to an entrance display output portion 110 through a communication portion 42. Then, the entrance display output portion 110 outputs by displaying the received direction indicator sign D.

According to the refrigerator 10 of the embodiment, a delivery person entering the house 100 can be visually informed of firstly which way to go. With this, it is possible to provide the delivery person with information useful for reaching a room Rh in which the refrigerator 10 is installed, and therefore to guide the delivery person smoothly to the room Rh in which the refrigerator 10 is installed.

Note that an entrance sound output portion configured of a speaker, for example, may be provided in the entrance of the house 100, and the controller 41 may transmit sound information such as "go straight" to the entrance sound output portion to output the sound information from the entrance sound output portion.

Fourth Embodiment

Figure 7:
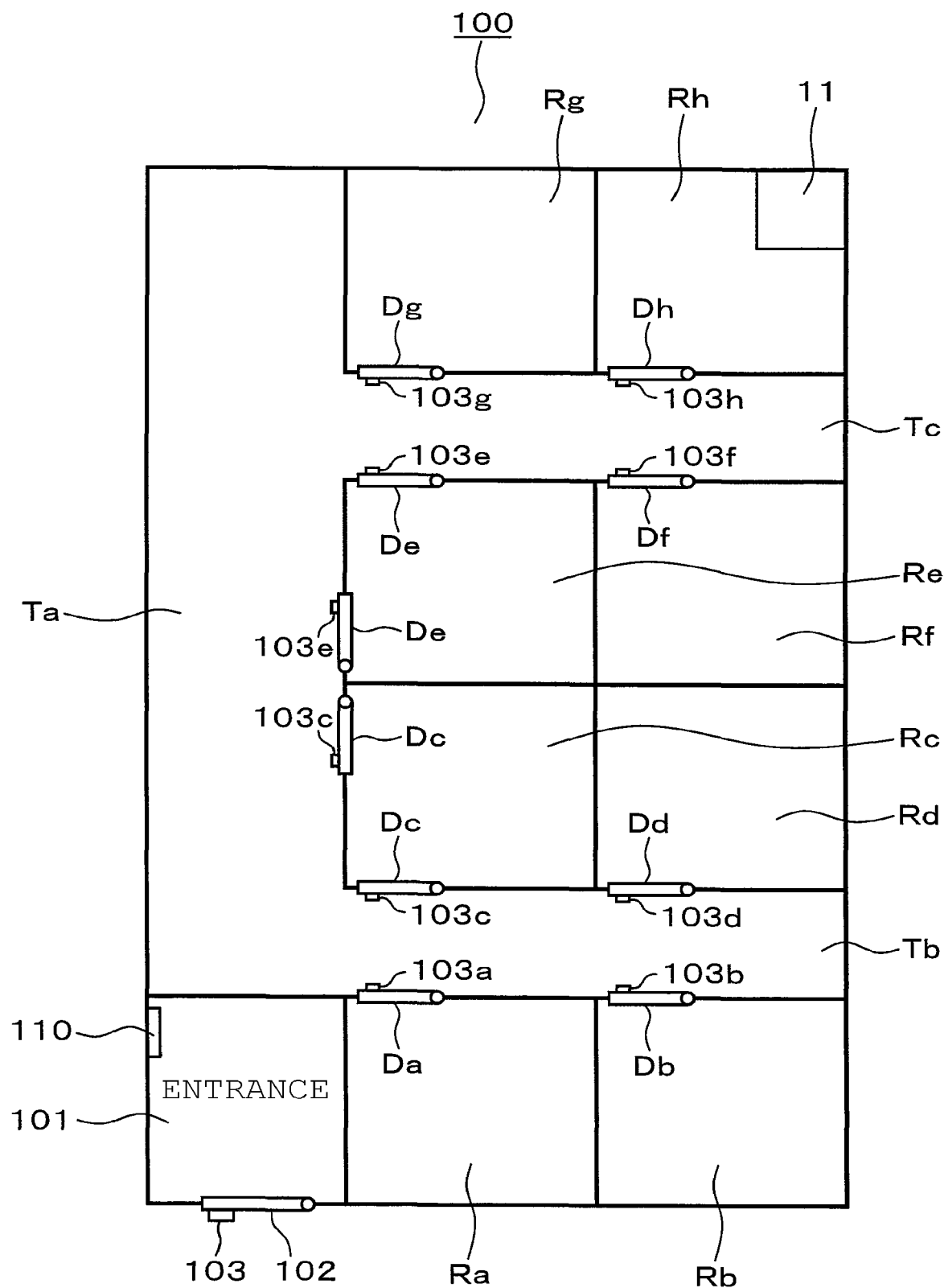
FIG. 7 is a diagram schematically showing an exemplar state inside a house when output means of a fourth embodiment is inactive.

A fourth embodiment, too, is an embodiment related to guidance processing. Specifically, as shown in FIG. 7, multiple smart keys 103a to 103h as an example of output means are provided in a house 100. The smart keys 103a to 103h are respectively provided in doors Da to Dh of rooms Ra to Rh in the house 100. In the embodiment, the smart keys 103a to 103h have a light-emitting portion configured of an LED, for example. The smart keys 103a to 103h emit light from the light-emitting portion to function as an example of output means.

Figure 8:
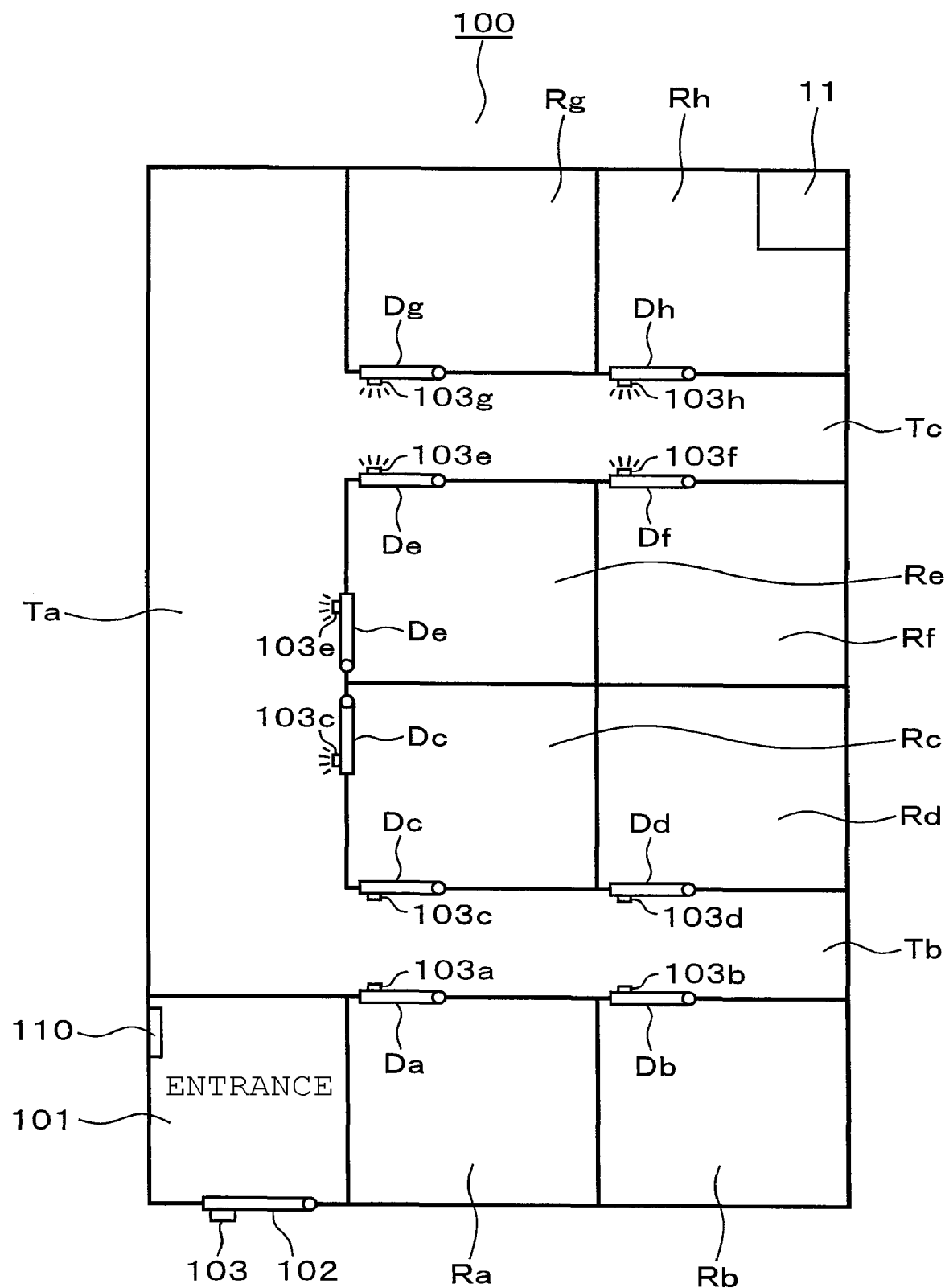
FIG. 8 is a diagram schematically showing an exemplar state inside a house when the output means of the fourth embodiment is active.

When human presence in the house 100 is detected by a human detector-processor 51, as shown in FIG. 8, a controller 41 operates and causes light to be emitted from the light-emitting portions of the smart keys 103c, 103e, 103f, 103g, and 103h provided between an entrance 101 which is the doorway of the house 100 to the room Rh in which a refrigerator main body 11 is installed.

Note that in the example of FIG. 8, while two smart keys 103c are provided in the room Rc, the light-emitting portion of one smart key 103c facing a passage Ta that forms a route from the entrance 101 of the house 100 to the room Rh in which the refrigerator main body 11 is installed emits light, whereas the light-emitting portion of the other smart key 103c facing a passage Tb that does not form the route from the entrance 101 of the house 100 to the room Rh in which the refrigerator main body 11 is installed does not emit light.

Moreover, while two smart keys 103e are similarly provided in the room Re, one smart key 103e faces the passage Ta that forms the route from the entrance 101 of the house 100 to the room Rh in which the refrigerator main body 11 is installed, and the other smart key 103e faces a passage Tc that forms the route from the entrance 101 of the house 100 to the room Rh in which the refrigerator main body 11 is installed. Hence, both light-emitting portions of the two smart keys 103e emit light.

According to a refrigerator 10 of the embodiment, the light-emitting portions of the smart keys 103c, 103e, 103f, 103g, and 103h provided between the entrance 101 of the house 100 and the room Rh in which the refrigerator main body 11 is installed emit light. Hence, a delivery person can reach the room Rh in which the refrigerator main body 11 is installed by following the light emitting smart keys 103c, 103e, 103f, 103g, and 103h, and can more easily reach the refrigerator 10.

Note that the smart keys 103a to 103h of the door of each of the rooms may be provided with a sound output portion configured of a speaker or a buzzer, for example, and sound such as "refrigerator this way" may be output from the sound output portions of each of the smart keys 103c, 103e, 103g, and 103h provided between the entrance 101 of the house 100 and the room Rh in which the refrigerator main body 11 is installed.

Moreover, instead of making the smart keys 103a to 103h on the door of each room also serve as output means, dedicated output means configured of a light-emitting portion or a sound output portion, for example, may be provided.

Fifth Embodiment

A fifth embodiment, too, is an embodiment related to guidance processing. Note that while guidance processing for guiding a delivery person from an entrance of a house 100 to a refrigerator 10 has been exemplified in the above embodiments, the fifth embodiment describes an example of guidance processing for guiding a delivering person from a refrigerator 10 to an entrance of a house 100.

Figure 9:
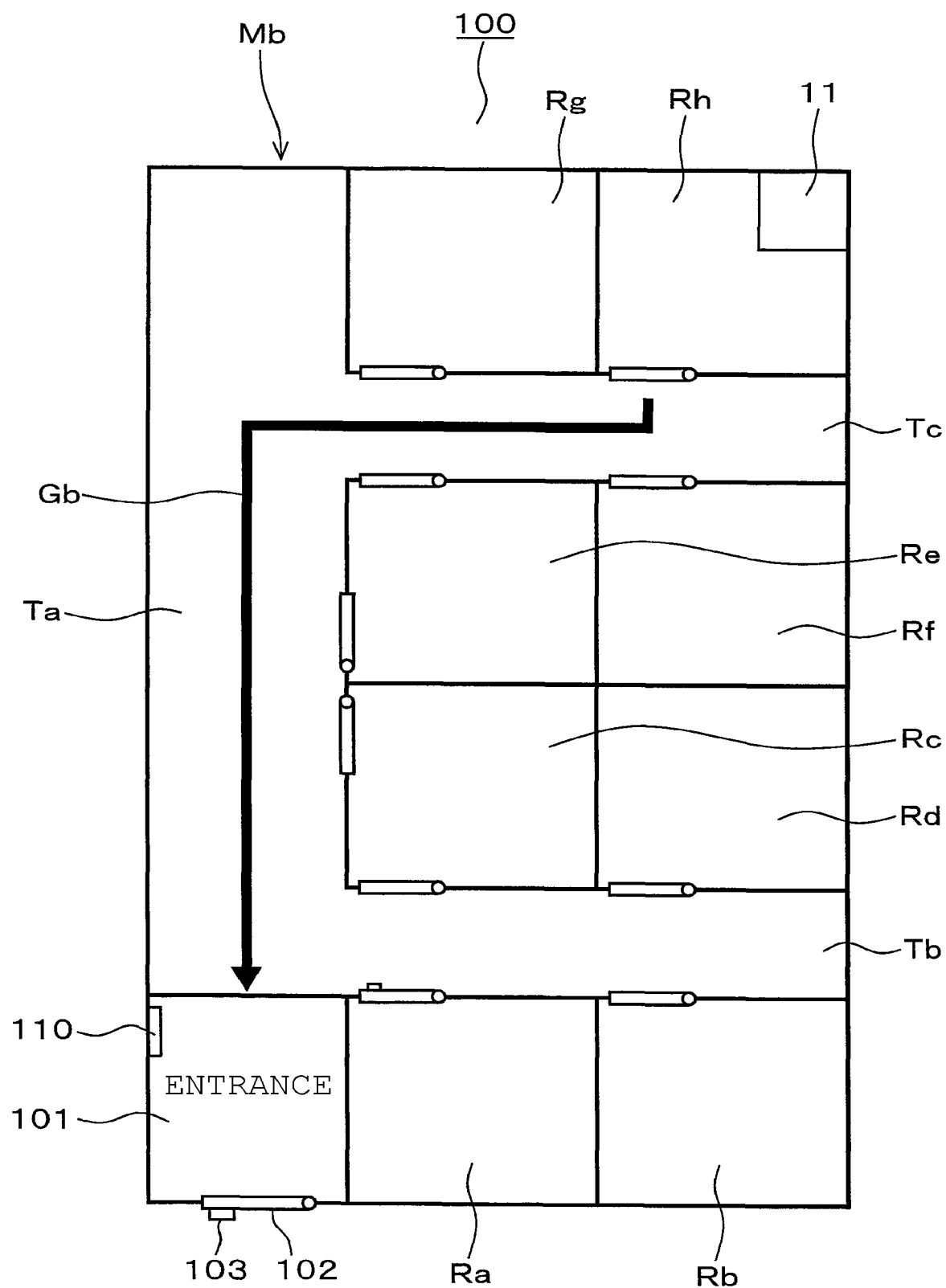
FIG. 9 is a diagram schematically showing an example of a return route map of a fifth embodiment.

Specifically, a controller 41 stores a return route map Mb exemplified in FIG. 9 in an unillustrated storage portion configured of a memory, for example. The return route map Mb is map information showing the layout of multiple rooms Ra to Rh and the positional relation among passages Ta to Tc in the house 100, and also showing a route Gb from an entrance 101 of the house 100 to the room Rh in which a refrigerator main body 11 is installed. A user can create the return route map Mb by way of an unillustrated operation portion for operating the refrigerator 10, for example. The user can also modify the return route map Mb by way of the operation portion of the refrigerator 10.

After locking both a refrigerator compartment door 12a and a freezer compartment door 13a, the controller 41 displays the return route map Mb stored in the storage portion on a display output portion 43.

According to the refrigerator 10 of the embodiment, even when a delivery person forgets the route to the entrance 101 of the house 100 from the room Rh in which the refrigerator main body 11 is installed, the delivery person can be guided smoothly to the entrance 101 of the house 100, on the basis of the return route map Mb displayed on the display output portion 43. In particular, when the house 100 is large or has many rooms, the route to the entrance 101 of the house 100 may be complicated. For this reason, by guiding a delivery person having completed storage of food in the refrigerator 10 smoothly to the entrance 101 of the house 100, it is possible to prevent the delivery person from needlessly wandering inside the house 100, and thereby improve security.

According to the refrigerator 10, the return route map Mb as visual information can be used to clearly inform the delivery person of the location of the entrance 101 of the house 100.

Moreover, completion of storing food in the refrigerator 10, that is, locking of both the refrigerator compartment door 12a and the freezer compartment door 13a can be used as a trigger to guide the delivery person to the entrance 101 of the house 100, so that the delivery person having completed the storing can be quickly prompted out of the house 100.

Sixth Embodiment

A sixth embodiment is an embodiment for supporting a delivery person when storing food in a refrigerator 10.

Figure 10:
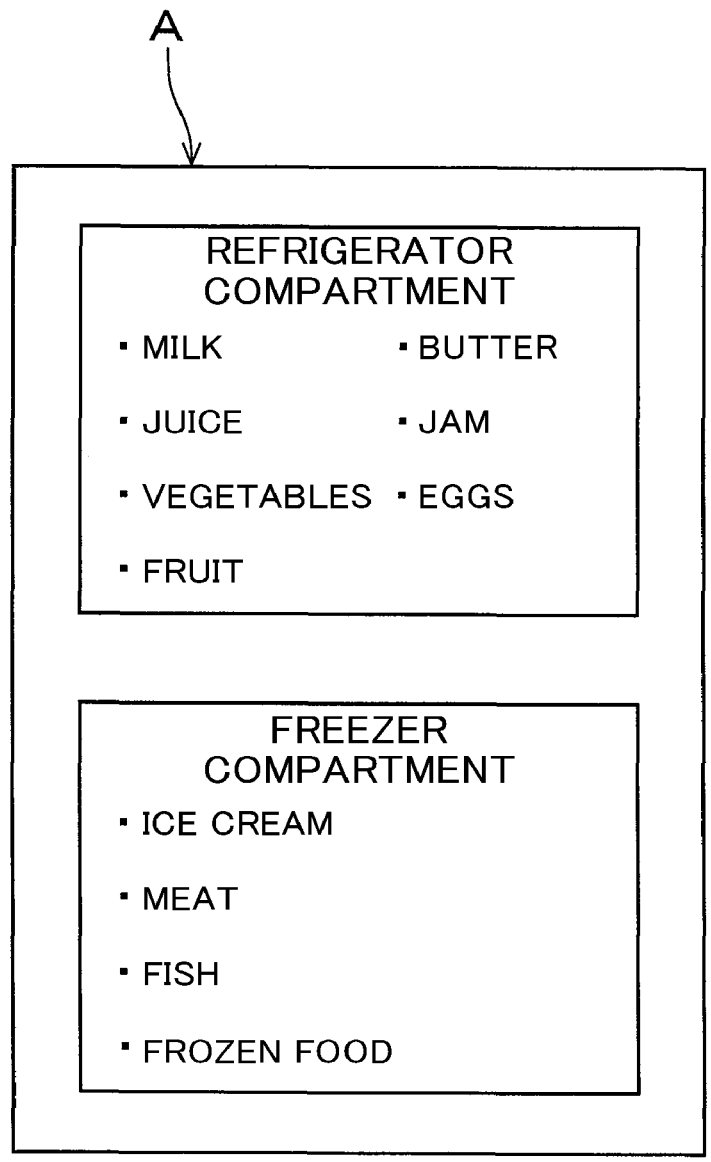
FIG. 10 is a diagram schematically showing an example of storage instruction information of a sixth embodiment.

Specifically, a controller 41 stores storage instruction information A exemplified in FIG. 10 in an unillustrated storage portion configured of a memory, for example. The storage instruction information A is information indicating which food to store in which storage room, that is, information indicating the name of the food and the name of storage rooms 12, 13 for storing the food. In the example of FIG. 10, the storage instruction information A indicates that milk, juice, vegetables, fruits butter, jam, and eggs should be stored in the refrigerator compartment 12, and that ice cream, meat, fish, and frozen food should be stored in the freezer compartment 13. A user can create the storage instruction information A by way of an operation portion of the refrigerator 10, for example. The user can also modify the storage instruction information A by way of the operation portion of the refrigerator 10.

After releasing the lock of at least any one of refrigerator compartment door 12a and a freezer compartment door 13a, the controller 41 displays the storage instruction information A stored in the storage portion on a display output portion 43.

According to the refrigerator 10 of the embodiment, a delivery person can store multiple types of food in appropriate storage rooms 12, 13, on the basic of the storage instruction information A displayed on the display output portion 43. Note that the controller 41 may output sound information such as "store milk in refrigerator compartment," and "store ice cream in freezer compartment," through a sound output portion 44.

Seventh Embodiment

In a seventh embodiment, a controller 41 further includes a function of confirming whether predetermined food is stored in a predetermined storage room. Specifically, upon completion of storage of food in a refrigerator 10, the controller 41 performs storage state check processing exemplified in FIG. 11. The storage state check processing is processing for confirming whether appropriate food is stored in the storage rooms 12, 13 after completion of storing food in the refrigerator 10.

Figure 11:
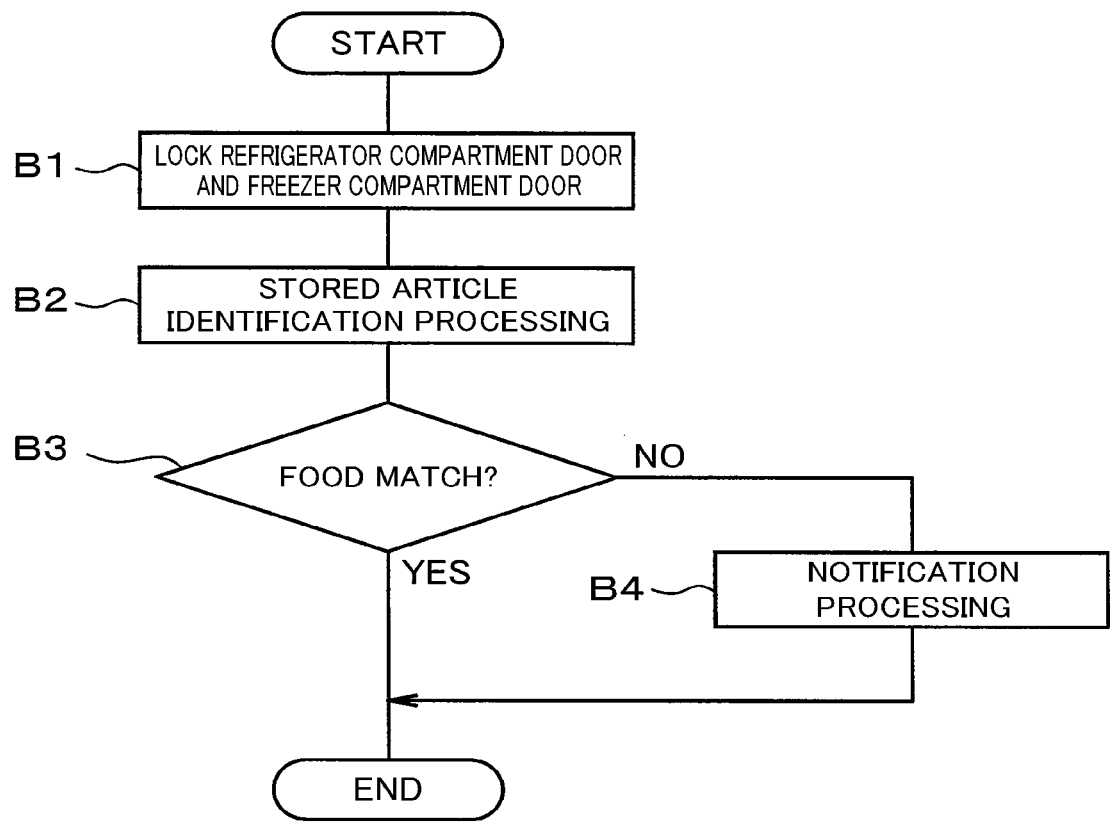
FIG. 11 is a flowchart showing an example of storage state check processing of a seventh embodiment.

Specifically, as shown in FIG. 11, after locking both the refrigerator compartment door 12a and the freezer compartment door 13a (B1), the controller 41 performs stored article identification processing (B2). The stored article identification processing is processing for identifying food as articles stored in the storage rooms 12, 13. The controller 41 can analyze image data of the inside of the storage rooms 12, 13 obtained by the active refrigerator compartment inside camera 31A and freezer compartment inside camera 31B, and identify the food stored in each of the storage rooms 12, 13. Moreover, if electronic tags are attached to the food, the controller 41 can identify the food stored in each storage room 12, 13 by reading the electronic tags.

The controller 41 previously stores storage master information indicating which food should be stored in which of the storage rooms 12, 13. Then, the controller 41 matches the identified by the identification processing and actually stored in the storage rooms 12, 13 with the food that should be stored in the storage rooms 12, 13 specified in the storage master information, and determines whether the two match (B3).

If the food in the storage rooms 12, 13 identified by the identification processing and the food in the storage rooms 12, 13 specified in the storage master information match (B3: YES), the controller 41 determines that appropriate food is stored in each of the storage rooms 12, 13, and ends the processing. Meanwhile, if the food in the storage rooms 12, 13 identified by the identification processing and the food in the storage rooms 12, 13 specified in the storage master information do not match (B3: NO), the controller 41 determines that appropriate food is not stored in each of the storage rooms 12, 13, and performs notification processing (B4).

In the notification processing, the controller 41 may output by displaying message information indicating that predetermined food is not stored in predetermined storage rooms 12, 13, through a display output portion 43. The controller 41 may also output, by sound, message information indicating that predetermined food is not t ed in predetermined storage rooms 12, 13, through a sound output portion 44. Thus, if the delivery person is still near a refrigerator main body 11, it is possible to prompt the delivery person to correct the storing on the basis of the output message information.

At this time, the controller 41 is preferably capable of performing identification processing with higher accuracy, to also determine which food stored in which of the storage rooms 12, 13 is inappropriate, and output information related thereto. This allows the delivery person to correct the storing promptly and accurately.

The controller 41 may also transmit message information to an entrance display output portion 110, and output the message information from the entrance display output portion 110 as well. With this, even if the delivery person has already left the vicinity of the refrigerator main body 11, the message information can be output to the delivery person in an entrance 101 of the house 100 to prompt correction of the storing to the delivery person.

The controller 41 may also transmit message information to a mobile terminal 300, and output the message information from the mobile terminal 300 as well. With this, a user outside can be notified that the food is not stored in appropriate storage rooms 12, 13. This allows the user to come home early to store the food stored in the inappropriate storage room in an appropriate storage room. The user can also call the delivery person's cellular phone or contact a call center of the empty home delivery service, for example, to instruct correction of storing to the delivery person.

According to the refrigerator 10 of the embodiment, it is possible to check whether multiple types of food is stored in appropriate storage rooms 12, 13 after completion of storage of food by the delivery person, to prevent the food from being left in inappropriate storage rooms 12, 13. The embodiment is particularly effective when food that needs to be frozen is erroneously stored in the refrigerator compartment 12, or when food that should not be frozen is erroneously stored in the freezer compartment 13.

Eighth Embodiment

An eighth embodiment, too, is an embodiment for supporting a delivery person when storing food in a refrigerator 10. Specifically, when storing food in the refrigerator 10, there are cases where checking by a user outside is necessary, such as when it is unclear which food to store in which storage room 12, 13, or when the storage rooms 12, 13 are already full of food and cannot store any more food, for example. The eighth embodiment deals with such cases.

Figure 12:
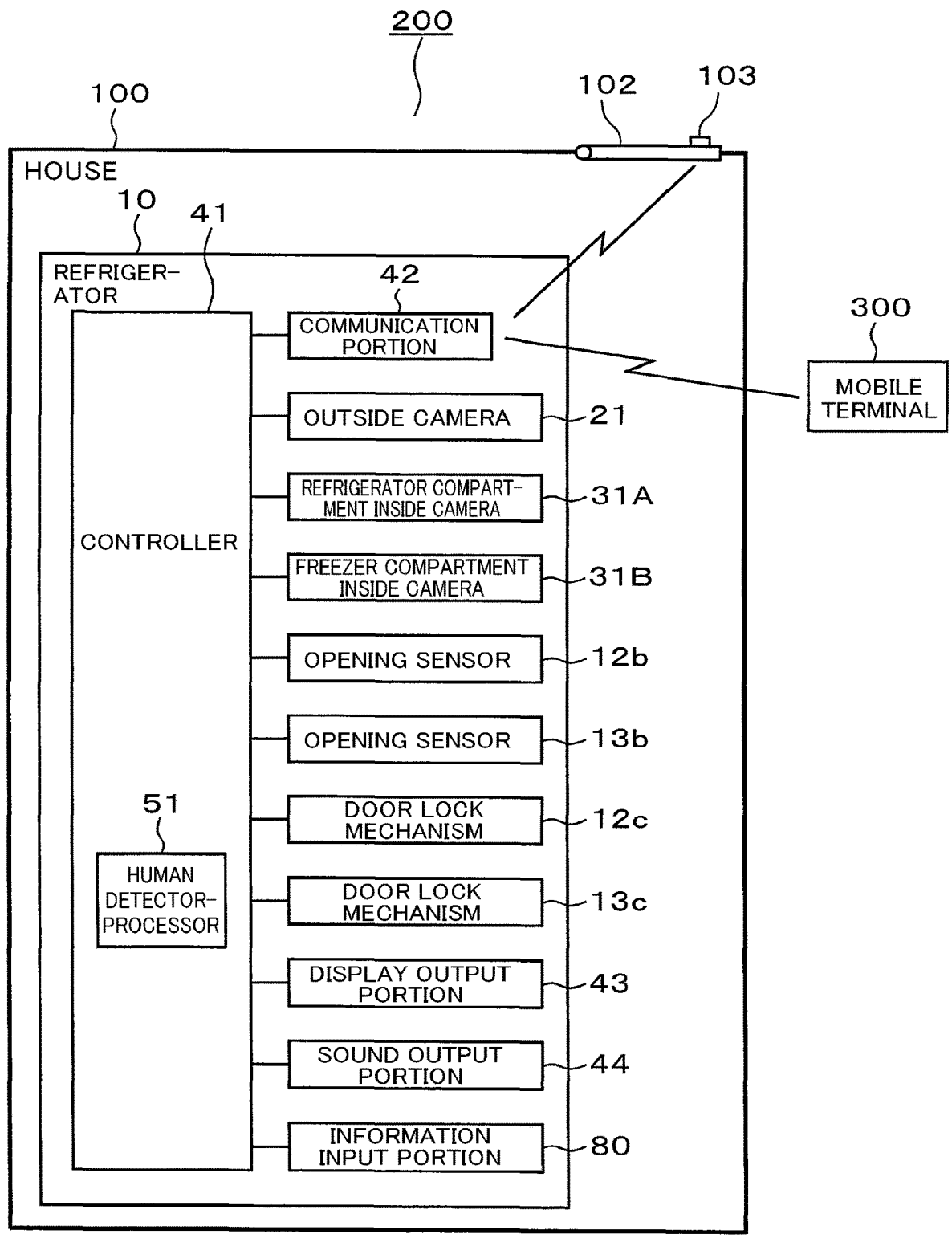
FIG. 12 is a diagram schematically showing a configuration example of an empty home delivery system of an eighth embodiment.

Specifically, as shown in FIG. 12, a controller 41 further includes an information input portion 80. The information input portion 80 is configured of an input device capable of inputting characters, numbers, symbols, and the like, for example. The delivery person can input question information that he/she wants to ask the user outside, through the information input portion 80. Question information is information such as "Which of the refrigerator compartment or the freezer compartment should the meat be stored?" or "There is no room in the refrigerator compartment. What should I do?", that is, query information related to matters that the delivery person cannot decide on his/her own, and need to be checked by the user outside.

The controller 41 transmits the question information input by the information input portion 80 to a mobile terminal 300 of the user outside, by way of a communication portion 42. Then, the mobile terminal 300 outputs the received question information. The question information may be output by displaying from the mobile terminal 300, or may be output by sound. After checking the content of the question information output on the mobile terminal 300, the user can call the delivery person's cellular phone, for example, to answer to the question from the delivery person. Note that the user may transmit a reply mail from the mobile terminal 300 to the controller 41, and the controller 41 may display the received reply mail on a display output portion 43. This allows the delivery person to continue with storing of food on the basis of the content of the reply mail.

Other Embodiments

Note that the embodiment is not limited to the multiple embodiments described above, and may be modified or expanded as follows, for example. For example, the multiple embodiments described above may be combined appropriately.

Each of the outside camera 21, the refrigerator compartment inside camera 31A, and the freezer compartment inside camera 31B may have an adjustable recording range. If a monitoring camera is provided inside the house 100, the monitoring camera may be associated with construction of the empty home delivery system, so that security can be improved even more.

The human detector-processor 51 may detect that a human enters the room Rh, on the basis of a room door open signal received from the smart key 103h provided in the room Rh in which the refrigerator plain body 11 is installed. The human detector-processor 51 may also detect that a human leaves the room Rh, on the basis of a room door close signal received from the smart key 103h provided in the room Rh in which the refrigerator main body 11 is installed.

The household electrical appliance of the embodiment is not limited to the refrigerator 10 for storing food, and may be a household electrical appliance other than the refrigerator 10, such as a washing machine, a dryer, an automatic rice cooker, a microwave oven, an IH cooker, an air conditioner, and a vacuum cleaner. By applying the embodiment to laundry equipment such as a washing machine and a dryer, for example, when ordering delivery of articles such as a detergent and a fabric softener to a shelf in a lavatory where the laundry equipment is installed, for example, the laundry equipment can be used as monitoring devices while the house is empty.

By applying the embodiment to cooking equipment such as an automatic rice cooker, a microwave oven, and an IH cooker, for example, when ordering delivery of articles such as food to a shelf in a kitchen where the cooking equipment is installed, for example, the cooking equipment be used as monitoring devices while the house is empty.

When the embodiment is applied to an air conditioner, for example, when ordering delivery of articles such as a magazine and sundry goods to a shelf in a room where the air conditioner is installed, the air conditioner can be used as a monitoring device while the house is empty. In particular, since an air conditioner is often attached to an upper part of a room wall, such an air conditioner can be used as a monitoring device while the house is empty, to monitor from a bird's eye view from an upper part of the room.

When the embodiment is applied to a vacuum cleaner, for example, when ordering delivery of articles such as a magazine and sundry goods to a shelf in a room where a vacuum cleaner is placed when not in use, for example, the vacuum cleaner can be used as a monitoring device while the house is empty. In particular, since a vacuum cleaner is often placed in a corner of a room or near a window, such a vacuum cleaner can be used as a monitoring device while the house is empty, to monitor the whole from a corner of the room or from near a window. When the embodiment is applied to a self-propelled vacuum cleaner, the self-propelled vacuum cleaner can be used as a moving monitor robot while the house is empty.

While multiple embodiments of the present invention have been described, the embodiments are presented as examples, and are not intended to limit the scope of the invention. The novel embodiments can be carried out in other various forms, and can include various omissions, replacements, and modifications without departing from the gist of the invention. The embodiments and its modifications are included in the scope and gist of the invention, and are included within the scope of the invention and its equivalents described in the scope of claims.

What is claimed is:

1. A household electrical appliance comprising:
a peripheral camera that records a periphery of a household electrical appliance main body;
a controller that controls operation of the peripheral camera; and
a human detector processor that detects human presence, wherein
the human detector processor detects that a human enters a house and performs the detecting of human presence more than two times,
when human presence is detected by the human detector processor, the controller activates the peripheral camera and performs guidance processing of guiding the human to a room in which the household electrical appliance main body is installed,
the controller is configured to perform processing of a plurality of types of guidance processing as the guidance processing, each of the plurality of types of guidance processing having a different processing content,
the plurality of types of guidance processing include at least a guidance processing for guiding the human from an entrance of the house to the household electrical appliance main body, and a guidance processing for guiding the human from the household electrical appliance main body to the entrance of the house,
when human presence in the house is detected by the human detector processor, the controller transmits a notification by sound indicating that monitoring is performed, and
when approach of a human to the household electrical appliance main body is detected by the human detector processor, the controller transmits a notification in a visual form that monitoring is performed.

2. The household electrical appliance according to claim 1, wherein
the human detector processor detects that a human enters a room in which the household electrical appliance main body is installed.

3. The household electrical appliance according to claim 1, wherein
as the guidance processing, the controller performs processing of showing a route from a doorway of a house to the room in which the household electrical appliance main body is installed.

4. The household electrical appliance according to claim 1, wherein
as the guidance processing, the controller performs processing of showing a direction of the room in which the household electrical appliance main body is installed, as viewed from a doorway of a house.

5. The household electrical appliance according to claim 1, wherein:
a plurality of output devices are provided in a house; and
as the guidance processing, the controller activates the output devices provided between a doorway of the house and the room in which the household electrical appliance main body is installed.

6. The household electrical appliance according to claim 1, wherein:
the household electrical appliance main body includes
a storage portion that stores an article, and
a door that opens and closes the storage portion; and
when approach of a human to the household electrical appliance main body is detected by the human detector processor, the controller releases a lock of the door.

7. The household electrical appliance according to claim 6 further comprising:
an internal camera that records the inside of the storage portion; and
a door opening detector that detects opening of the door, wherein
the controller activates the internal camera on the basis of a detection result of the door opening detector.

8. The household electrical appliance according to claim 7, wherein
the controller displays a human recorded by any one of the peripheral camera and the internal camera.

9. The household electrical appliance according to claim 6, wherein
the controller locks the door when the door is closed.

10. The household electrical appliance according to claim 6, wherein
the controller measures a time between releasing the lock and re-locking of the door.

11. The household electrical appliance according to claim 10 further comprising communication means that communicably connects to an external terminal, wherein
when a measured predetermined time is longer than a predetermined reference time, the controller notifies the external terminal by the communication means.

12. The household electrical appliance according to claim 6, wherein
when human presence is detected by the human detector processor, or when the lock of the door is released, the controller transmits a notification that monitoring is performed.

13. The household electrical appliance according to claim 6, wherein
when the door is locked, the controller performs guidance processing of guiding a human to a doorway of a house.

14. The household electrical appliance according to claim 6, wherein:
the household electrical appliance main body has a plurality of the storage portions; and
when the lock of the door is released, the controller outputs information indicating a name of an article and the storage portion which to store the article.

15. The household electrical appliance according to claim 1, wherein
the controller measures a time between detection and no detection of human presence by the human detector processor.

16. The household electrical appliance according to claim 1, wherein
the controller confirms whether a predetermined article is stored in a predetermined storage portion.

17. The household electrical appliance according to claim 16, wherein
if a predetermined article is not stored in a predetermined storage portion, the controller transmits a notification to that effect.

18. A refrigerator configured as the household electrical appliance according to claim 1.

* * * * *